Figure 8:
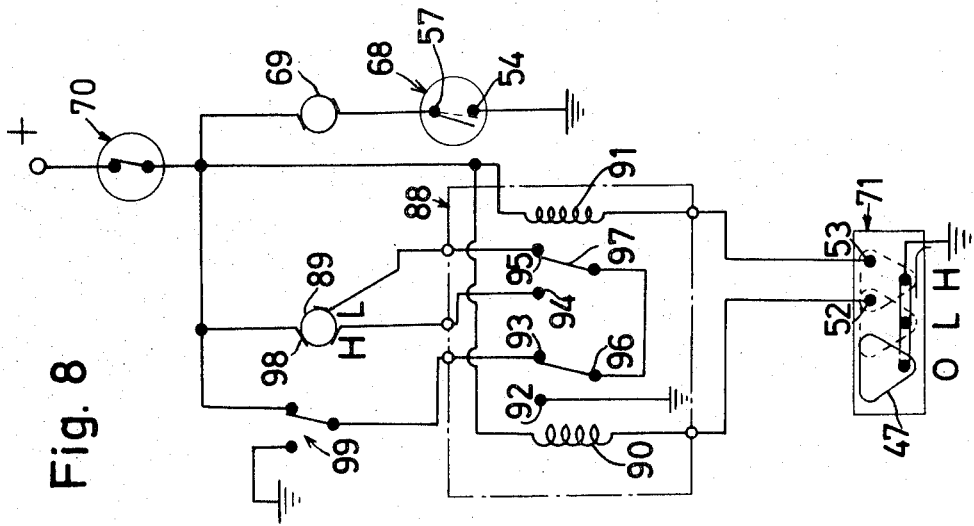

United States Patent
Suzuki et al.

[15] 3,671,691
[45] June 20, 1972

[54] MULTIPLE SWITCH CONSTRUCTION

[72] Inventors: Masaru Suzuki, Aicki-ken; Yukinobu Murakami, Hiroshima, both of Japan

[73] Assignee: Kabushiki Kaisha, Tokai Rika Denki Seisakusho, Aichi-ken, Japan

[22] Filed: Dec. 4, 1970

[21] Appl. No.: 95,119

[52] U.S. Cl.............................200/61.54, 200/4, 200/61.27, 200/61.57
[51] Int. Cl. .........................................................H01h 9/00
[58] Field of Search ......................200/61.54, 61.27, 4, 61.57

[56] References Cited

UNITED STATES PATENTS

| | | |
|---|---|---|
| 3,511,943 | 5/1970 | Kibler..................................200/61.54 |
| 3,221,119 | 11/1965 | Weathers et al....................200/61.27 |
| 3,499,125 | 3/1970 | Stol................................200/61.54 X |
| 2,453,035 | 11/1948 | Ponsy................................200/61.27 |
| 3,510,839 | 5/1970 | Elliott et al. ....................200/61.27 X |
| 3,331,932 | 7/1967 | Winogrocki et al..................200/4 X |

Primary Examiner—David Smith, Jr.
Attorney—Craig, Antonelli & Hill

[57] ABSTRACT

A multiple switch construction particularly for use in automotive vehicles or the like having a plurality of switches, for example, for operating a head-light controlling device, a windshield wiper, a windshield washer and a turn indicator device. Of which, two switches are housed in the steering column and the remaining two switches are accommodated in a handle mounted on a free end of a lever of which the other end is drivingly associated with said first mentioned two switches. These switches can be operated by turning the lever in the direction parallel to the plane of the steering wheel, shifting the lever in the direction at right angles to the plane of the steering wheel, turning the handle in the circumferential direction with respect to the lever and/or pushing the handle in the axial direction with respect to the lever.

5 Claims, 8 Drawing Figures

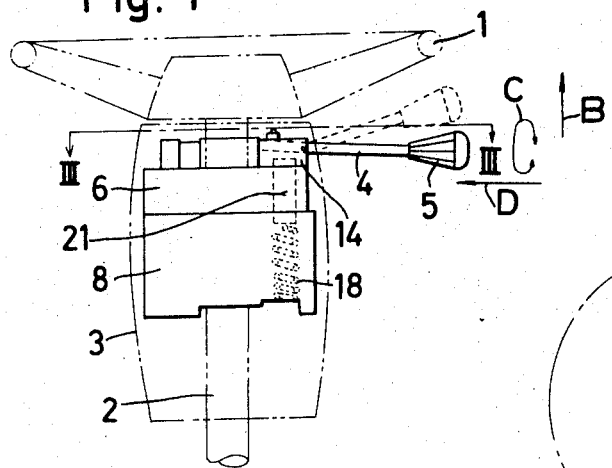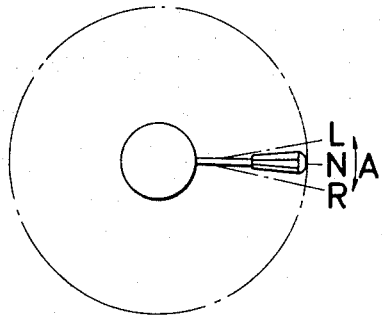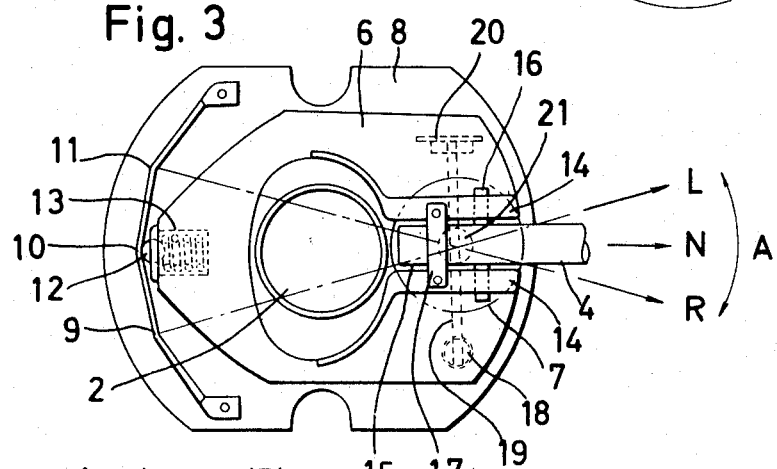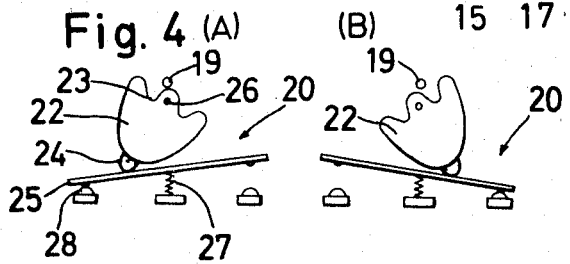

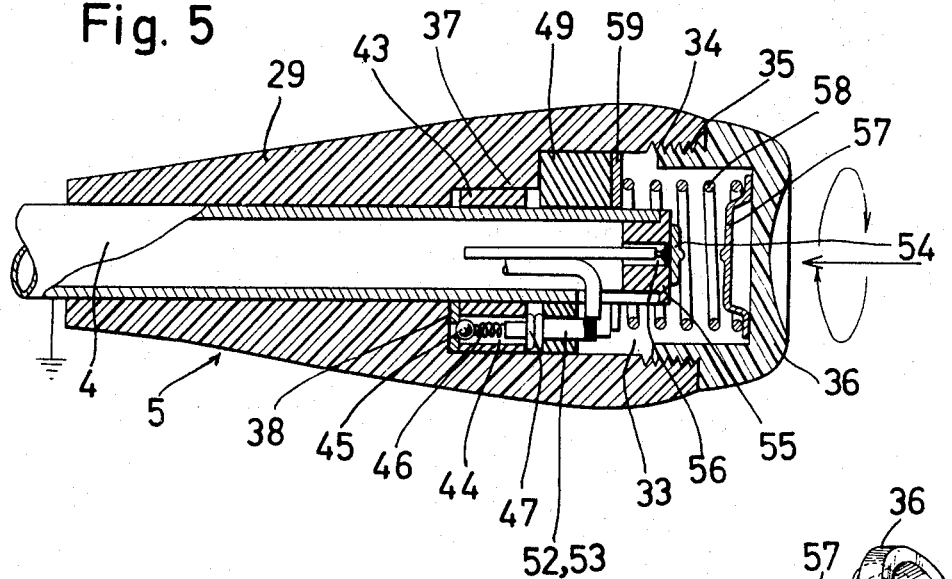
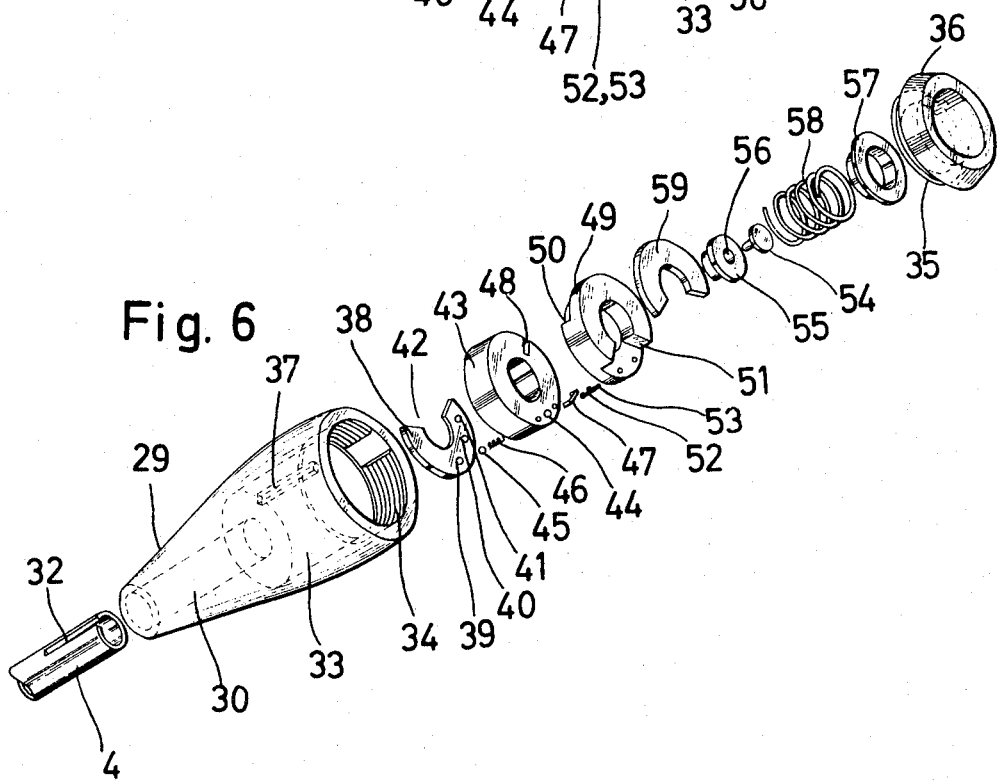

MULTIPLE SWITCH CONSTRUCTION

The present invention relates to an electric switch construction and, more particularly, to a multiple switch construction particularly for use in automotive vehicles comprising a plurality of switches housed in the steering column of an automotive vehicle and a handle portion of an elongated member extending through said steering column and adapted to be operated by moving said lever and said handle portion in a plurality of different directions.

More specifically, the present invention has been directed to reduce the number of switches disposed at the instrument panel in the interior of an automotive vehicle or the like by incorporating some of the switches at the instrument panel into a steering column and a handle mounted on a free end of an elongated lever heretofore only associated with the turn indicator device.

Heretofore, a windshield wiper switch, a windshield washer switch, a head-light controlling switch and a turn indicator switch of an automotive vehicle have generally been installed in the instrument panel and, therefore, the operator of the automotive vehicle is sometimes compelled to destroy his normal driving posture when he desires to gain access to any of these switches. To eliminate this inconvenience, various improvements have been made wherein the turn indicator switch is housed in the steering column so that said switch can be operated by means of an elongated lever extending in the radial direction of the steering wheel and wherein the head-light controlling switch is disposed on the floor so that said switch can be operated by a foot of the automotive vehicle operator. Although these improvement have their own advantages, they are still far from convenience, and recently there has been proposed to provide a head-light controlling switch in a handle portion of an elongated lever for operating the turn indicator switch. According to the newly proposed device, the head-light controlling switch can be operated by pushing in the axial direction with respect to the elongated lever a push-button disposed at the outer extremity of the handle portion.

Accordingly, one object of the present invention is to provide a multiple switch construction having a plurality of switches, the first one of which can be operated by turning a lever in the direction parallel to the plane of the steering wheel, the second one of which can be operated by shifting said lever in the direction at right angles to said plane, the third one of which can be operated by turning a handle in the circumferential direction with respect to the lever and the fourth one of which can be operated by pushing the handle in the axial direction with respect to the lever.

Another object of the present invention is to provide a multiple switch construction having a plurality of switches by which the operator of an automotive vehicle can operate any one of said switches without destroying his normal driving posture which may, in an extreme case, result in a traffic accident.

A further object of the present invention is to provide a multiple switch construction of simplified and compact type that can be manufactured at low cost with a small number of necessary parts.

A still further object of the present invention is to provide an electric wiring system adapted for use in connection with various switches of the multiple switch construction of the above referred to.

A still further object of the present invention is to provide a multiple switch construction wherein one of the switches accommodated in the handle has three positions, i.e., the Stop position wherein the windshield wiper motor is inoperative, the Low position wherein said motor is driven at low speed and the High position wherein said motor is driven at high speed, these positions being adapted to be selected by turning the handle in the circumferential direction with respect to the lever.

A still further object of the present invention is to provide a multiple switch construction by which the number of switches to be installed at the instrument panel in the interior of an automotive vehicle can be reduced so that a spacing of the instrument panel can be saved for other purposes.

Figure 7:
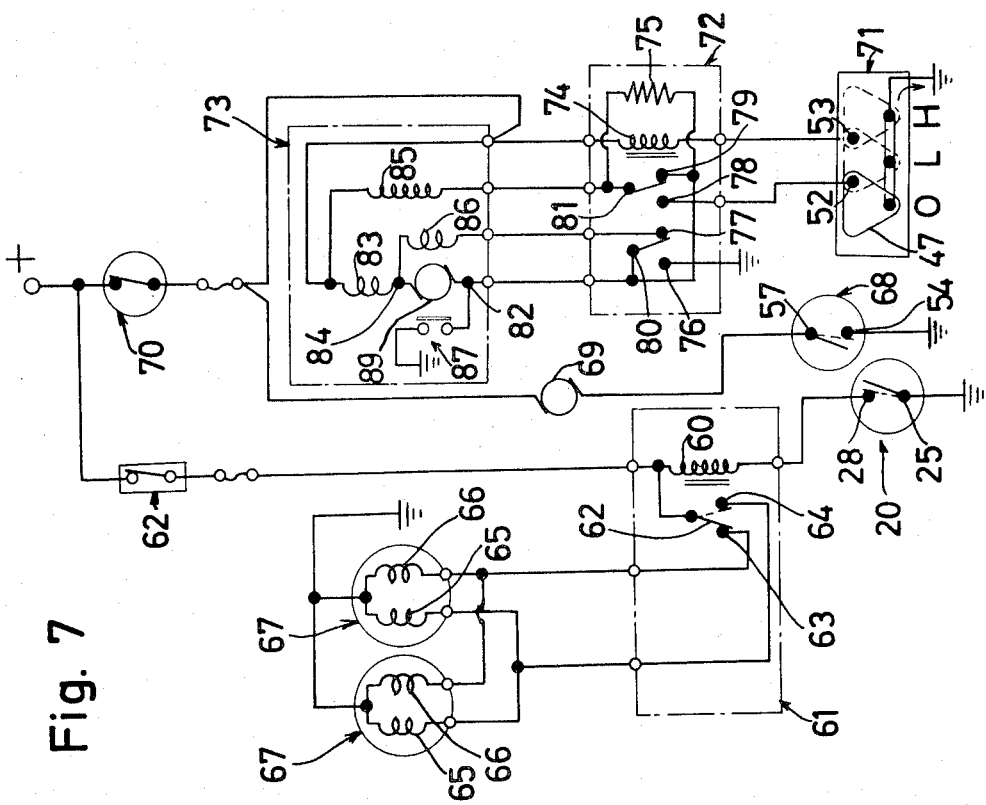

These and other objects and features of the present invention will become apparent from the description taken in conjunction with preferred embodiments thereof with reference to the attached drawings, in which;

FIG. 1 is a schematic side view of the interior of a steering column generally used in an automotive vehicle, FIG. 2 is a schematic top plan view of FIG. 1, FIG. 3 is a cross sectional view taken along the line III—III shown in FIG. 1, FIGS. 4(A) and (B) are schematic diagrams showing a head-light controlling switch of simplified form employed in the preferred embodiments of the present invention, FIG. 5 is a sectional view of a handle showing a manner in which two switches are built up in accordance with the teachings of the present invention, FIG. 6 is an exploded view of FIG. 5, FIG. 7 is a circuit diagram used in connection with the switch construction of the present invention and FIG. 8 is a modified circuit diagram with respect to that of FIG. 7.

Referring now to FIG. 1 and FIG. 2, reference numeral 1 represents a steering wheel mounted on the adjacent end of a shaft 2 in a known manner and reference numeral 3 represents a steering column surrounding the shaft 2 and disposed below the hub of said steering wheel 1. Reference numeral 4 represents a lever, preferably made of metal, extending through the steering column 3, an inner end of which being connected with a turn indicator device as shown in FIG. 3 in a known manner while the other outer end being mounted with a handle structure 5. This lever is, as will be mentioned later, associated with a head-light controlling switch adjacent to the inner end thereof.

The lever 4 is operable in two direction, i.e., in the direction A parallel to the plane of the steering wheel 1 for operating the turn indicator device and in the direction B at right angles to the plane of the steering wheel for operating the head-light controlling switch. Similarly, the handle structure 5 is operable in two directions, i.e., in the circumferential direction C of the lever 4 for operating, for example, a windshield wiper and in the axial direction D of the lever 4 for operating, for example, a windshield washer of which one or more spray nozzles are disposed on the bonnet of an automotive vehicle.

In FIG. 3, the turn indicator device is schematically illustrated as comprising an abutment rim 6 pivotally mounted at 7 on a solid block 8 within the steering column 3 so that the abutment rim 6 may be moved to three positions, as indicated by L, N, and R, which are defined by detent recesses 9, 10 and 11 to which a collapsible ball member 12 received in a recessed portion 13 formed in one side of said abutment rim 6 can be engaged as the abutment rim 6 is pivoted about its pivot 7 by means of the lever 4.

This turn indicator device may be of any known construction and the present invention is not essentially directed to the details of such a turn indicator device. Accordingly, major parts of the turn indicator device such as turn indicator switch and means for effecting an automatic return of the abutment rim 6 or the lever 4 to the N position are herein omitted. However, so far as the movement of the lever in the direction A parallel to the plane of the steering wheel 1 involves, the only portion of the turn indicator switch associated with the movement of the lever 4 is herein recited in a simple arrangement to enable those skilled in the art to understand the essential features of the present invention.

In the other side of the abutment rim 6 remote from the recessed portion 13, a pair of vertically extending opposed walls 14 is formed with the upper surface of the abutment rim 6. The inner end 15 of the lever 4 is loosely received in a spacing defined by said opposed walls 14 and tiltably supported by a pin 16 extending between said walls 14 across the lever 4. The tilting angle of the lever, i.e., the stroke of movement of the lever in the direction B at right angles to the plane of the steering wheel 1, can be restricted by a rigid member 17 fixedly straddling over the opposed walls 14.

Housed in the solid block 8 is a resilient member 18 having an arm 19 transversely extending from an upper end of said resilient member 18, a free end of said arm 19 being associated with a head-light controlling switch 20 as shown in FIG. 4. At an intermediate portion of the arm 19 in register with the axis of the pivot 7, a plunger rod 21 is interposed between said arm and the inner end 15 of the lever 4. The resilient member 18 is preferably in the form of a compression spring whereby the lever can be maintained to the downwardly biased position by the resilient force of said member 18 which is transmitted to the inner end 15 of the lever 4 through the arm 19 and then the plunger rod 21.

The head-light controlling switch 20 may be of any construction, preferably, in the form of a snap acting switch having a pair of movable and fixed contacts. In the example as shown in FIG. 4, the switch 20 includes a snap acting cam member 22 having a pair of notches 23 capable of receiving the free end of the arm 19 and a projection 24, and a seesaw member 25 of electroconductive material. As can be understood from FIG. 4(A) and (B), the head-light controlling switch herein recited for reference is such that, when the lever 4 is shifted in the direction B against the resilient member 18 through the plunger rod 21, the arm 19 is depressed with its free end engaged in the left-hand notch 23 to cause the cam member 22 to rotate in the counterclockwise direction. As the cam member 22 rotates in said direction about the axis 26, the seesaw member 25 is rotated in the opposite direction about its fulcrum 27 to thereby establish the condition as shown in FIG. 4(B). From the above description, it will be clearly understood how a fixed contact 28 and the seesaw member 25 which constitutes a movable contact are electrically connected or disconnected.

Referring now to FIG. 5 and FIG. 6 in which details of the handle structure 5 are shown, the handle structure 5 comprises a casing 29 of frusto-conical shape made of suitable insulating material and having a bore 30 in which the opposite end of the lever 4 having a split 32 is slidably accommodated. The larger end of the casing 29 is provided with an enlarged chamber 33 in the coaxial relation with the bore 30, a portion of the inner peripheral surface of said chamber 33 being formed with a thread 34 for receiving therein a threaded end 35 of a plug 36. Within the enlarged chamber 33, a nail portion 37 is integrally formed with the inner peripheral surface thereof and extending between the annular depth of said chamber to an intermediate portion of said peripheral surface. This nail portion 37 acts to limit rotation of the casing 29 about the lever 4 as will be mentioned later.

Disengagement of the casing 29 from the lever 4 can be reliably prevented by a substantially horseshoe shaped stop ring 38 of electroconductive material which is non-rotatably fixed to the lever 4 by means of key-and-keyway connection or any known method. This stop ring 38 is formed with a plurality of equally spaced detent holes 39, 40 and 41 and an arc-shaped clearance 42, the acute angle of the clearance 42 being such that, when the nail portion 37 integral with the casing 29 is received in said clearance 42, said clearance limits rotation of the casing 29 about the axis of the lever 4 preferably to a substantially 45° in cooperation with said nail portion 37. In the example as shown, this acute angle of the clearance 42 is 45° and the three detent holes 39, 40 and 41 are spaced at intervals of 15°.

Positioned next to the stop ring 38 within the chamber 33 is a nonconductive carrier ring 43 rotatably fixed to the lever 4 and having a suitable thickness. This carrier ring 43 is formed with an axially extending through hole 44 in which a detent ball 45 and a compression spring 46 are accommodated while the right-hand end of said through hole 44 is closed by a metal contact strip 47. This carrier ring 43 is also formed on its periphery with an axially extending keyway 48 so sized that, when said ring 43 is accommodated in the chamber 33, the nail portion 37 steadily engages said keyway 48 to enable the carrier ring 43 to be rotated in response to rotation of the casing 29, i.e., the handle structure 5. This carrier ring 43 thus constructed serves as a movable contact of a windshield wiper switch having three switching positions, i.e., H, L and O positions as will be mentioned later, which are defined by the three detent holes 39, 40 and 41 of the stop ring 38 to which the detent ball 45 normally outwardly urged by the compression spring 46 is engageable.

Also accommodated in the chamber 33 and nonrotatably mounted on the lever 4 next to the carrier ring 43 is a nonconductive anchor ring 49 formed with a first segmental recess 50 of the size substantially equal to the arc-shaped clearance 42 of the stop ring 38 and a second segmental recess 51 in which two terminal members 52 and 53 are fixed so as to contact the strip 47. This anchor ring 49 is mounted on the lever 4 in such a manner that the first segmental recess 50 faces toward the interior of the chamber 33 in register with the clearance 42 while the second segmental recess 51 is brought into register with the contact strip 47 fixed to the carrier ring 43. The terminal members 52 and 53 are respectively connected with wiring ends by means of, for example, soldering, which are in turn connected with an electric circuit as shown in FIG. 7 or FIG. 8. These terminal members 52 and 53 serves as fixed contacts of the wind-shield wiper switch and are adapted to cooperate with the contact strip 47 of the carrier ring 43.

The arrangement of the contact strip 47 and the terminal members 52 and 53 in the case where the circuit as shown in FIG. 7 is employed is such that, when the handle structure 5 is rotated from the 0 position to the L position wherein the detent ball 45 is engaged in the detent hole 40, the both terminal members 52 and 53 are connected to each other by the contact strip 47 which is in turn connected to the ground in the order through the compression spring 46, the detent ball 45, the stop ring 39 and thus the lever 4 and, when the handle structure 5 is rotated from the L position to the H position wherein the detent ball 45 is engaged in the detent hole 41, only the contact member 53 is connected by the contact strip 47 to the ground.

Alternatively, in the case where the circuit shown in FIG. 8 is employed, the arrangement is such that, when the handle structure 5 is rotated to the 0 position, only the terminal member 52 is connected by the contact strip 47 to the ground and, when the handle structure 5 is rotated to the H position, the both terminal members 52 and 53 are connected to each other by the contact strip 47 which is in turn connected to the ground.

In either case, the 0 position denotes the inoperative position of the windshield wiper motor. However, it is to be noted that it can be easily contemplated to provide switching positions more than 3 in number.

While the foregoing description is directed to the structure of the screenshield wiper switch within the handle structure 5, a windshield washer switch is illustrated in the same figures as comprising a fixed contact 54 disposed in the center of the opening of the outer extremity of the lever 4 and insulated from said lever by means of a rubber pad 55 having an axially extending hole 56 in which a power supply wire is accommodated. A movable contact 57 is in the form of a metallic dish-shaped member and seated against the left-hand surface of the plug 36. While the fixed contact 54 serves as positive terminal, the movable contact 57 is in connection with the lever 4 by means of a compression spring 58 and a metal flat washer 59, the latter being non-rotatably mounted on the lever in the same manner as described in connection with the stop ring 38. The compression spring 58 does not only act as electric conductor, but also acts to urge the plug 36 in the direction apart from the fixed contact 54 and, thus, when in assembled condition, a combination of the plug and the casing, i.e., the handle structure 5 can be normally urged to the right with respect to the lever.

With this construction as hereinbefore fully disclosed, various switches can be operated by moving the lever or the handle structure attached to said lever: By turning the lever 4 in the direction A parallel to the plane of the steering wheel 1, the conventional turn indicator switch can be operated; by shifting the lever 4 in the direction B at right angles to the plane of the steering wheel, the head-light controlling switch can be operated; by turning the handle structure 5 in the circumferential direction C of the lever 4, the windshield wiper switch can be operated; and by moving the handle structure 5 in the axial direction D of the lever, the windshield washer switch can be operated.

The electric wiring system which can be advantageously employed in connection with the multiple switch construction according to the present invention will be hereinafter described with reference to FIG. 7 and FIG. 8.

In FIG. 7, the head-light controlling switch 20 has the seesaw member or movable contact 25 connected with the ground and the fixed contact 28 connected with one end of a relay coil 60 of a relay 61, the other end of said coil 60 being connected with a power source (+), i.e., positive terminal of a D.C. battery, through a main switch 62 therefor. This relay 61 includes a relay switch having an armature contact 62 and a pair of fixed contacts 63 and 64, said armature contact 62 being engaged to the fixed contact 63 unless current flows through the relay coil 60. This fixed contact 62 is in turn connected with one end of a high beam filament 66 of a head-light bulb 67 while the other fixed contact 64 is connected with one end of a low beam filament 65 thereof, the other end of either of these filaments 65 and 66 being connected with the ground, i.e., negative terminal of the D.C. battery.

This circuit associated with the head-light controlling switch 20 is such that, so long as the main switch 62 is closed and when the lever is subsequently shifted in the direction A so as to actuate the switch 20, the movable contact 25 is connected with the fixed contact 28 to excite the relay coil 60. As the relay coil 60 is excited, the armature contact 62 is engaged to the fixed contact 64, thus achieving the switch-over from the high beam filament 66 to the low beam filament 65. Nevertheless, so long as the main switch 62 is closed and no current flows through the coil 60, the high beam filament 66 is maintained in the burning condition.

The windshield washer switch, generally indicated by 68, comprises a pair of the movable and fixed contacts 57 and 54 (See also FIGS. 5 and 6), the former being connected with the ground while the latter being connected through a washer motor 69 in series to a main switch 70 which is in turn connected to the common power source.

The windshield wiper switch is generally indicated by 71. The circuit associated with said windshield wiper switch 71 includes a relay 72 comprising a relay coil 74, a resistor 75, a first relay switch consisting of an armature contact 80 and a pair of first and second contacts 76 and 77, and a second relay switch consisting of an armature contact 81 and a pair of first and second contacts 78 and 79 and a wiper motor assembly 73 comprising a series winding 83, a shunt winding 85, an auxiliary winding 86, an armature having a pair of brush terminals 82 and 84, and an automatic return switch 87 used for automatically returning a wiper blade to a predetermined position even after the windshield wiper switch 71 is in the 0 position.

The terminal member 52 is connected with the first fixed contact 78 of the second relay switch, the armature contact 81 of said second relay switch being connected with one end of the shunt winding 85 while the second fixed contact 79 thereof being connected with the armature contact 80 of the first relay switch. The terminal member 53 is connected with one end of the relay coil 74, the other end of said coil 74 being connected with the power source through the main switch 70. The resistor 75 is interposed between the armature contacts 80 and 81 of the first and second relay switches. The first fixed contact 76 of the first relay switch is connected with the ground while the second fixed contact 77 thereof is connected with one end of the auxiliary winding 86 of which the other end is connected with the brush terminal 84. Also connected with this brush terminal 84 is one end of the series winding 83, the other end of said winding 83 being connected with the other end of the shunt winding 85 and the power source. The remaining brush terminal 82 is connected with the armature contact 80 of the first relay switch and the automatic return switch 87 which is in turn connected with the ground.

In this arrangement according to the present invention as hereinbefore described, it is assumed that the main switch 70 is closed and the automatic return switch 87 is open unless the wiper blade is in the predetermined position. If the handle structure 5 is turned from the 0 position to the L position, the terminal members 52 and 53 are both connected to the ground by means of the contact strip 47. In this condition, the coil 74 is excited to cause the armature contacts 80 and 81 of the first and second relay switches to connect to the first fixed contacts 76 and 78 of said relay switches, respectively. Since the resistor 75 is short-circuited at this time and the shunt winding 85 can be, therefore, intensively energized, the wiper motor can be driven at low speed.

If the handle 5 is further turned to the H position, only the terminal member 53 will be connected with the ground. Even in this condition, the first and second relay switches are in the same position as the handle structure 5 is in the L position. However, short-circuit of the resistor 75 does not take place while current from the power source can flow to the armature of the wiper motor through the series winding 83 and then to the ground across said armature by means of the armature contact 80 of the first relay switch and, therefore, the wiper motor can be driven at high speed.

In FIG. 8, a modified circuit associated particularly with the windshield wiper switch 71 is shown wherein like components are designated by like reference numerals.

The modified circuit according to the present invention includes the wiper motor 89 of which the field core is a permanent magnet, and a relay 88 comprising a first relay coil 90, a first relay switch having a pair of fixed contacts 92 and 93 and an armature contact 96 normally connected with the second fixed contact 93 unless current flows through the relay coil 90, a second relay coil 91, and a second relay switch having a pair of first and second fixed contacts 94 and 95 and an armature contact 97 normally connected with the second fixed contact 95 unless current flows through the relay coil 91.

The terminal member 52 is connected with the main switch 70 through the relay coil 90 in series while the terminal member 53 is connected with the same main switch 70 through the relay coil 91 in series. The first fixed contact 92 of the first relay switch is connected with the ground while the second fixed contact 93 thereof connected with a movable contact of an automatic return switch having two positions, one of which being connected with the ground while the other being connected with the power source. The first fixed contact 94 of the second relay switch is connected with a brush terminal H of the wiper motor 89 while the second fixed contact 95 thereof is connected with a brush terminal L, the other brush terminal 98 of the motor 89 being connected with the power source. The both armature contacts 96 and 97 are connected to each other.

In this arrangement, when the handle structure 5 is in the L position the relay coil 90 is excited and the armature contact 96 is subsequently connected with the fixed contact 92. Therefore, the motor 89 can be driven at low speed. On the contrary, when the handle structure is in the H position, the both terminal members 52 and 53 are connected with the ground by means of the contact strip 47. Accordingly, the both coils 90 and 91 can be excited so that the armature contacts 96 and 97 can be respectively connected with the fixed contacts 92 and 94, whereby the motor 89 can be driven at high speed.

Although the present invention has been fully described in connection with the multiple switch construction used in an automotive vehicle, it can be employed in any industry where a plurality of switches of various type are employed for operating a single electric apparatus or instrument. In addition, various modifications and changes are apparent to those skilled in the art and, therefore, the present invention is not to be

What is claimed is:

1. A steering column switch assembly for motor vehicles comprising a steering column disposed below the hub of the steering wheel, a first switch housed in said steering column and associated with a turn indicator device, an elongated lever extending through said steering column, one end of said lever being adapted to operate said first switch when selectively rotated in the direction parallel to the plane of the steering wheel while the other end thereof being mounted with a handle, a second switch housed in said steering column and associated with a head-light controlling device so as to be operated by a portion of said lever adjacent to said first mentioned end of the lever when the latter is shifted in the direction at right angles to the plane of the steering wheel, a third switch housed in said handle and adapted to be operable in the circumferential direction with respect to the lever for operating a windshield wiper motor, said third switch including a casing which constitutes a part of the handle having an enlarged chamber provided with a nail portion, a conductive stop ring having a plurality of detent holes and an arc-shaped clearance for limiting rotation of the handle in cooperation with said nail portion and nonrotatably mounted on the second mentioned end of the lever, a carrier ring including a detent member, a resilient member for collapsibly urging said detent member toward said stop ring and a contact strip and formed on its periphery with a keyway engageable with said nail portion, and an anchor ring including a pair of terminal members adapted to be bridged by said contact strip at one selected position of the carrier ring, whereby said carrier ring can be rotated in response to rotation of the handle to give an electric switching action, and a fourth switch housed in said handle adjacent to said third switch and adapted to be operable in the axial direction with respect to the lever for operating a windshield washer motor.

2. The steering column switch assembly according to claim 1, wherein said third switch has three switching positions defined by positioning the detent member to any selected one of the detent holes.

3. The steering column switch assembly according to claim 1, wherein said fourth switch comprises a casing which constitutes a part of the handle having an enlarged chamber provided with a nail portion, a plug adapted to enclose said handle so as to close the chamber, a conductive washer nonrotatably mounted on the lever at a position adjacent to the outer extremity of the lever, a conductive member seated against the inner surface of said plug, a compression spring interposed between said washer and conductive member, a fixed contact member, and an insulating pad having an axially extending hole in which said contact member is accommodated, said casing and plug being normally urged in one direction away from said contact member, whereby, when the handle is moved in the axial direction with respect to the lever, said fourth switch can be closed by means of engagement between the contact member and the conductive member.

4. The steering column switch assembly according to claim 1, wherein one of said terminal members is connected with a shunt winding of a windshield wiper motor, which is in turn connected with the power source, through a second relay switch of a relay assembly having a first relay switch, a relay coil and a resistor interposed between said first and second relay switches, and the other terminal member is connected in series with the power source through the relay coil whereby, when the handle is rotated to one position wherein the both terminal members are connected to the ground, a line connecting between the motor to the ground and a line connecting between the shunt winding to the ground are respectively established to short-circuit the resistor so that the motor can be driven at low speed and, when the handle is further rotated to another position wherein only one of said terminal members connected with the relay coil is connected with the ground, said two lines are respectively established without short-circuiting the resistor so that the motor can be driven at high speed.

5. The steering column switch assembly according to claim 1, wherein one of said terminal members is connected with the power source through a first relay coil while the other terminal member is connected with the power source through a second relay coil of a relay assembly having a pair of first and second relay switches, one of which being associated with the first relay coil and the other of which being associated with the second relay coil whereby, when the handle is rotated to one position in which the terminal member connected with the power source through the first relay coil is connected with the ground so as to cause the first relay switch to connect one terminal of the wiper motor to the ground through the second relay switch while a second terminal of said motor is connected with the power source, the motor can be driven at low speed and, when the handle is further rotated to another position in which the both terminal members are connected with the ground so as to cause the first and second relay switches to connect a third terminal of the motor to the ground through said both relay switches, the motor can be driven at high speed.

* * * * *